UNITED STATES PATENT OFFICE.

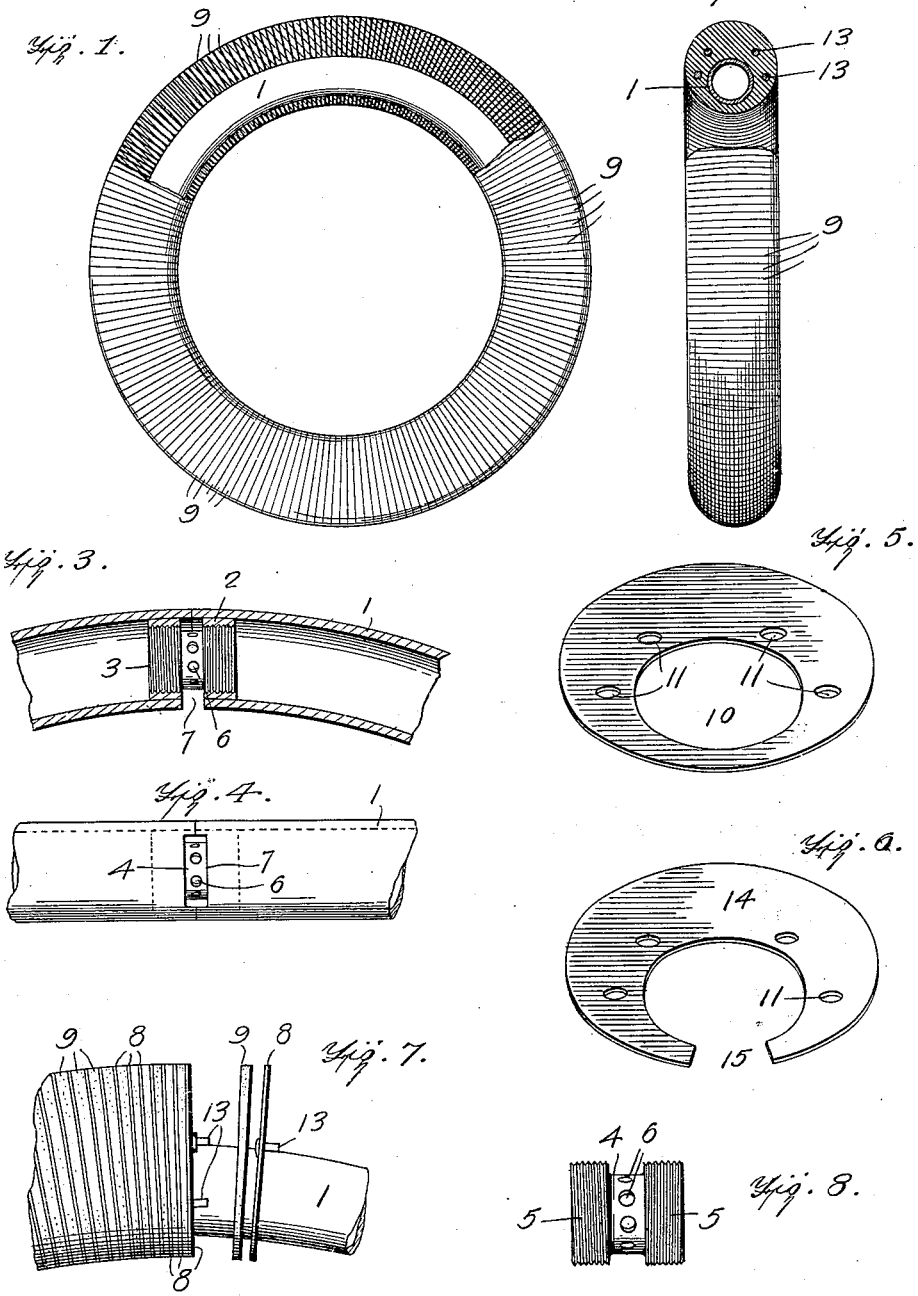

HERBERT A. WHEELING, OF CARTHAGE, MISSOURI.

TIRE.

1,104,158.  Specification of Letters Patent.  Patented July 21, 1914.

Original application filed June 14, 1912, Serial No. 703,641. Divided and this application filed September 30, 1912. Serial No. 723,071.

*To all whom it may concern:*

Be it known that I, HERBERT A. WHEELING, a citizen of the United States, and a resident of Carthage, in the county of Jasper and State of Missouri, have invented certain new and useful Improvements in Tires, of which the following is a specification.

My invention is an improvement in tires, and has for its object the provision of a resilient semi-solid built-up tire wherein the tire is so constructed that it will be noiseless in operation, and will be of great wearing capacity, and which is adapted for use in automobiles and other vehicles, and especially with the spring wheel forming the subject matter of my prior application, Serial No. 703,641, filed June 14, 1912, of which this is a divisional application.

In the drawings: Figure 1 is a side view partly in section of my improved tire; Fig. 2 is a transverse section of the tire; Fig. 3 is a partial longitudinal section, showing the manner of connecting the ends of the inner tube; Fig. 4 is a bottom plan view of Fig. 3; Fig. 5 is a perspective view of one of the disks; Fig. 6 is a similar view of one of the disks with a portion thereof removed; Fig. 7 is a side view of a portion of the tire during construction; and, Fig. 8 is an enlarged side view of the connecting means for the ends of the inner tube.

The present embodiment of the invention comprises an inner tube 1 of metal, the said tube being drawn and bent into annular shape. A bushing 2 is fitted into each end of the tube, and each of the said bushings is internally threaded, as shown at 3 in Fig. 3. The ends of the tube are connected by means of the device shown in Fig. 8, the said device consisting of a bushing 4 having each of its ends enlarged and externally threaded, as shown at 5, the said portions 5 being oppositely threaded, as are also the bushings 2. Between the threaded portions 5 the bushing is provided with an annular series of openings 6 for the engagement of a tool to turn the said connecting bushing to draw the ends of the inner tube together. It will be noted from an inspection of Figs. 3 and 4 that each end of the tube 1 is cut away on the inner side of the ring formed by the said tube, to form a slot or opening 7 for the insertion of the tool before mentioned. The ends of the tube are brought together, and the bushing 4 is turned to cause the threaded portions 5 to engage the threaded portions 3, and the said bushing 4 is turned until ends of the tube 1 are brought together closely, as shown in Figs. 3 and 4 so that the inner tube or core 1 incloses or covers the coupling means employed to unite its ends. The opening 7 is of sufficient length to expose several of the openings 6, as shown in Fig. 4.

The tire is composed of a plurality of disks 8 and 9 of metal and leather, respectively, each having an eccentric opening 10 for receiving the tube 1, and the disks are arranged alternately on the tube, and are secured together by rivets. Four holes or openings 11 are punched or otherwise formed in each of the said disks, and two rivets are made use of to connect each disk to its neighboring disk. The openings 10 being eccentric to the disks leaves a narrow portion on one side of the openings and on the inner side, and a wide portion on the other or outer side of the opening, and the openings 11 are arranged in this wide portion, and all of the four are arranged at equal distance from the center of the opening 10. In building up the tire, a disk 8 or 9 is placed on the tube 1, the said tube passing through the opening 10. Two rivets are then placed in two of the openings 11, the said rivets being similarly placed and the two other openings of the disk are provided with rivets placed in the opposite manner to the two rivets first mentioned. A disk 8 is then placed on the tube, and those openings of the said disk 8 which are not in register with the rivets already placed in the disk 9 are provided with rivets whose heads will be between the disks 8 and 9. The disk 8 is placed close against the disk 9, and the two rivets belonging to the disk 9 previously placed are headed or upset. The placing of rivets is continued in the same manner, each disk being secured to the two adjacent disks by two rivets. When the tube 1 is completely covered with disks placed as described, the ends of the said tube are drawn together by the bushing or coupling 4, and a plurality of the disks 14 shown in Fig. 6 are placed on the tube. Each of these disks has a section of its narrowest portion removed as indicated at 15, in order that the opening 7 will not be covered. The tightening of the bushing or coupling compresses the disks 14 and holds them firmly in place.

The opening or slot 15 is of a width to permit the disk 14 to be freely passed over the bushing 4 of the coupling, but not sufficient to permit it to pass over the core or tube 1. From the foregoing it will be seen that the solid sectional tread of the tire is formed of two series of perforated disks, one series,—formed of the disks 8, 9,—being strung upon the inner tube or core and constituting by far the larger portion of the tread, and the other, shorter series consisting of the slotted disks 14, which are employed to complete the tire tread and cover the connected end portions of the inner core. As already stated, the slots 15 of the disks 14 are wide enough to permit the disks to be freely passed over the coupling after it has united the ends of the core, but before such ends have been thereby drawn close together, but not of sufficient width to allow them to pass over the core; from which it follows that, after the ends of the core have been drawn together, as represented in Figs. 3 and 4, by the coupling 4, the core occupies the perforations 10 of said disks 14, which are then thereby held in place.

It will be noted from an inspection of Figs. 1, 2 and 7, that the tube 1 is at the inner side of the tire, the widest portion of each of the disks being at the outer side of the said tube. The tire is resilient, closely corresponding to a pneumatic tire, without any danger of puncture or blow-outs or like injuries, and when the disks 8 or 9 become worn or injured they can be removed and replaced by new ones. The wearing surface of the new tire is composed of alternate disks of metal and leather or like material, the metal protecting the fibrous material from wear, while the fibrous material imparts resiliency to the tire and also assists in the gripping or holding property of the tire. The rivets may be solid, hollow or split as may be desired. It will be understood that the disks 9 may be of any desired fibrous material, such as rubber, raw hide and combinations of the same.

I claim:

1. A tire of the character specified, comprising an inner annular tube of metal, an internally threaded bushing in each end of the tube, a coupling for the ends, the said coupling having each of its ends enlarged and externally threaded for engaging the bushings of the tube, the enlarged portions of the coupling being threaded in opposite directions, and the bushings at the ends of the tube being also threaded in opposite directions, said coupling having an annular series of openings between the threaded portions, and the ends of the tube being cut away at the inner side of the tube to form a recess for the insertion of a tool to engage the openings, a plurality of disks of metal and fibrous material each having an eccentric opening for receiving the tube, said disks being arranged with their widest portion outward, each disk having a plurality of openings, and rivets in the openings, said rivets connecting each disk to the two adjacent disks.

2. A tire of the character specified, comprising an inner tube of metal, a coupling for engaging the ends of the tube and drawing them tightly together, the said coupling being rotatable, and the tube having its ends cut away on the inner side to permit access to the coupling, said coupling having an annular series of openings for the engagement of the tool to rotate the same, and a plurality of disks of metal and fibrous material alternately arranged, and each having an eccentric opening for receiving the tube and with its widest dimension outward, each disk being connected to the adjacent disks at each side.

3. A tire for vehicles, comprising a non-resilient cylindrical core bent into circular form, a screw-threaded coupling uniting the ends of the core and arranged to be inclosed thereby when the ends are drawn together, a series of perforated disks strung upon the core and forming a solid sectional tread for the tire, and a second short series of perforated disks employed to complete the tire tread and to cover the connected end portions of the inner core, said disks being formed with slots leading to the interior perforations thereof, the width of said slots being such as to permit the disks to freely pass over the coupling when uniting the ends of the core and before they are fully drawn together, but not sufficient to permit them to pass over the core, whereby after the ends of the core have been drawn together by the coupling the core occupies the perforations of the slotted disks which are then thereby held in place.

HERBERT A. WHEELING.

Witnesses:
 LEIGH I. DODWELL,
 J. T. EDWARDS.

Copies of this patent may be obtained for five cents each, by addressing the "Commissioner of Patents, Washington, D. C."